Nov. 3, 1970  R. S. BRAY ET AL  3,538,301

GAS SHIELD, NON-CONSUMABLE-ELECTRODE PULSE ARC WELDING

Filed March 10, 1967

INVENTORS
ROBERT S. BRAY
LUIS J. LOZANO
BY
ATTORNEYS

United States Patent Office 3,538,301
Patented Nov. 3, 1970

3,538,301
GAS SHIELD, NON-CONSUMABLE-ELECTRODE PULSE ARC WELDING
Robert S. Bray, Cheshire, and Luis J. Lozano, Southington, Conn., assignors to Anaconda American Brass Company, a corporation of Connecticut
Filed Mar. 10, 1967, Ser. No. 622,868
Int. Cl. B23k 9/10
U.S. Cl. 219—137
10 Claims

ABSTRACT OF THE DISCLOSURE

In arc welding the abutting edges of two brass strips, two power sources are used in conjunction with non-consumable electrodes shielded by an inert-gas atmosphere. One power source principally supplies a D.C., straight polarity, background current sufficient to maintain an arc between the electrode and the work; the second power source, connected in parallel with the first, supplies a superimposed, pulsed D.C. current sufficient to fuse the metal and effect the weld. The joint consists of a series of overlapping beads which appear on both the observe and the reverse surfaces of the weld as a series of regularly-spaced ripples.

BACKGROUND OF THE INVENTION

Field of the invention

This invention relates to arc welding, and, more particularly, to gas shielded, non-consumable-electrode arc welding using a combination of a D.C. current and a pulsed current in the welding process.

Description of the prior art

The inert-gas-shielded, metal-arc (MIG) welding process is well known and has many commercial applications. The high welding current required to transfer the consumable electrode to the work, in the MIG welding, however, limits its application and generally is not suitable for welding many heat-sensitive and reactive metals, such as brass. MIG welding, unless it is well controlled, oftentimes causes overheating in these metals which leads to a high porosity weld and in the case of brass, zinc burnout.

To minimize the overheating problems, a non-consumable electrode is substituted in the MIG welding. The process using tungsten as a non-consumable-electrode is known as TIG welding process. TIG welding, because of its lower power requirement, creates smaller weld arc heat affected zones thus eliminating the problems of excess porosity and zinc burnout in the weld. TIG welding process, however, has its drawbacks. Notable among them are slow welding speed, arc instability, and limited ranges in which the welding can be successfully carried out without either burnthrough or insufficient penetration.

SUMMARY OF THE INVENTION

We have now found that the deficiencies in the conventional TIG welding can be substantially overcome by using a dual power supply system for the welding process. Broadly stated, the method of this invention for arc welding workpiece elements with a non-consumable electrode in a gas shielded atmosphere comprises applying simultaneously a direct-current and a pulsed welding current at a potential sufficient to establish an arc between the workpiece elements and the electrode. The pulsed welding current has a repeated frequency in the range between 15 and 240 per second and the direct-current is equivalent to 15% to 85% of the combined current for welding.

The weld thus obtained is a plurality of overlapping weld beads appearing as a series of uniform ripples along the weld on one surface of the work. Each weld bead penetrates the work to form a second series of uniform ripples.

In the welding process of this invention, it is noted that a more stable arc condition is obtained so that a low current arc can be readily used for very light gage material. Also, higher welding speeds, exceeding three times the speed of a conventional TIG welding process are possible, the speed being related proportionally to the frequency of the high current-density pulses. In addition, a wider range of current can be used without causing burn-through at the higher range and insufficient penetration at the lower range.

The pulsed current applied thereto generates a pulsating arc which leads to the formation of a series of overlapping puddles during welding as contrasted to the conventional TIG welding process which carries a puddle along with the electrode to form a continuous weld. The overlapping weld of this invention has a narrower heat affected zone and results in less zinc burnout in welding brass. The weld has uniform penetration and, after it has been cold worked and annealed, is not noticeable (there are no apparent differences in the structure).

DESCRIPTION OF THE PREFERRED EMBODIMENTS

Figure 1:
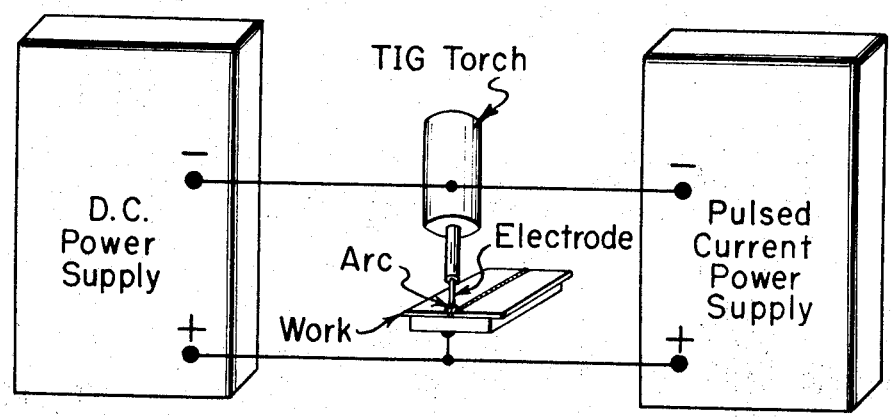
FIG. 1 is a schematic diagram showing an apparatus suitable for carrying out the welding process of this invention. As illustrated, the source of the pulsed current feeds the welding arc in parallel with a D.C. source for the background current supply required to maintain the arc. The D.C. source can be a generator or a transformer rectifier set with a suitable series impedance to control the background current.

In carrying out the process of this invention, the dual power sources are connected in parallel to a conventional TIG welding apparatus as illustrated in FIG. 1. The tungsten electrodes suitable for the welding process are available commercially and come in different sizes, for example, 1/8", 3/32", and 1/16". The diameter of the electrode selected affects the amount of the current that can be used. In general, the larger the diameter, the higher the total current it can handle.

The suitable inert gas for the welding process is helium or argon, or a mixture of these two gases. It is noted that there is less zinc burnout with 70–30 brass when argon is used as a shielding gas while helium shielding produces a smoother bead surface.

Figure 2:
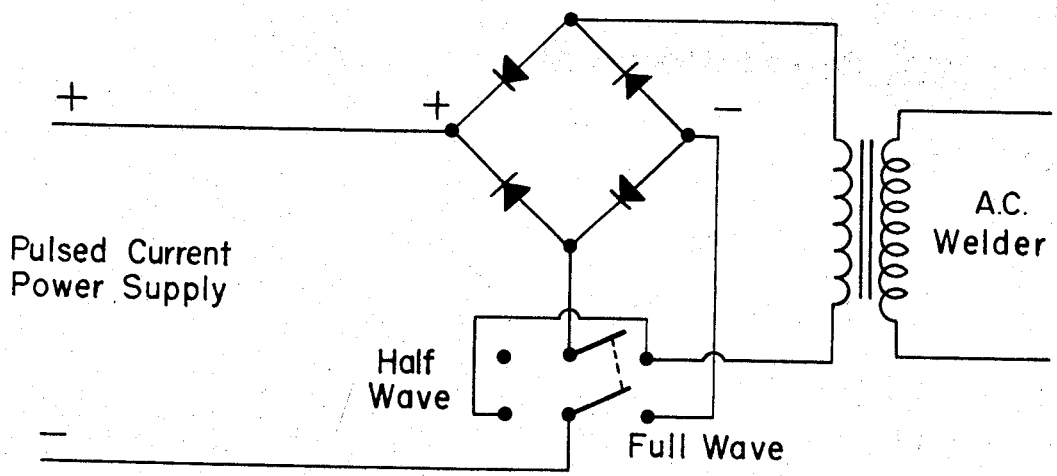
FIG. 2 is a diagram of a simple system for pulsed current supply which consists of a rectifier in a bridge circuit connected to an A.C. welding transformer and a switching device to change from full wave to half wave.

Further to illustrate this invention specific examples are described hereinbelow with reference to the drawings. In these examples, 70–30 brass strips of various thickness were welded using the apparatus shown in FIGS. 1 and 2. The shielding gases and the welding conditions are specified in the examples.

EXAMPLE I 0.020" 70–30 brass strips were welded at a speed ranging from 90 inches per minute (7.5 feet per minute) to 45 feet per minute. Welds made at 7.5 f.p.m. were performed under the following range of conditions:

TABLE I

Arc gap—1/16"–0.40"
Background D.C. current—28–30 amp.
Pulsed D.C. current—55–65 amp.
Total curent—83–85 amp.
½ wave 60 c.p.s.

In order to determine optimum welding speeds, a fixture was mounted on a rotating welding positioner. Bead-on-plate and butt test welds were made in the shape of 7" arcs with radii of about 12½". Table II lists the results of the bead-on-plate tests made at these higher speeds.

TABLE II

| Number: | Background current, amp. | Pulse current, amp. | Total current, amp. | Electrode Size, in. | Electrode gap, in. | Speed travel, f.p.m. | Amount of penetration |
|---|---|---|---|---|---|---|---|
| a | 40 | 105 | 145 | 3/32 | 0.031 | 24 | Full. |
| b | 40 | 160 | 200 | 3/32 | 0.031 | 30 | |
| c | 55 | 255 | 310 | 3/32 | 0.026 | 45 | |

The speed of 45 f.p.m. was considered to be the practical limit for a half wave pulse cycle at 60 c.p.s. At speeds greater than 45 f.p.m. the individual pulsed welds did not overlap sufficiently. Higher speed is obtained using higher frequency. A practical frequency range is between 60 to 120 c.p.s. The process of this invention is capable of welding at a speed above 70 f.p.m. at 120 c.p.s. Higher welding speeds would be possible with higher pulse frequencies.

Pulse welded specimens were rolled in three passes with two intermediate anneals from 0.020" down to 0.005". This was done in order to assess the effect of the rougher bead surface on the finished surface of the strip. The welded strip was thoroughly cleaned before each pass through the rolls. The surface resulting was completely free of defects.

EXAMPLE II

In this example, 0.16" thick, 70–30 brass strips 1⅛" wide were welded using the following conditions:

TABLE III

Range of currents to produce acceptable welds—60–81 amp. total
D.C. background current—20 amp.
Pulsed D.C. current—49–61 amp.
Arc gap—.030"
Tungsten electrode 2% thoriated 1/16" vertex angle—25°
Speed of travel—90 imp.
Gas shielding torch—argon—20 c.f.h.
Gas shielding backup—helium—~2 c.f.h.

We claim:
1. A method of arc welding workpiece elements with a non-consumable electrode in a gas shielded atmosphere which comprises applying to the work elements and said electrode simultaneously a background direct-current and a pulsed welding current at a potential sufficient to establish an arc, said pulsed welding current having a frequency in the range between 15 and 240 pulses per second and said background direct-current being equivalent to 15% to 85% of the total welding current and moving the electrode relative to the workpiece elements at rate whereby a plurality of overlapping weld beads are deposited on the workpiece elements to form a series of uniform ripples along the weld on one surface of the work.
2. A method according to claim 1 wherein the background direct-current is applied to maintain the arc during welding and said pulsed D.C. welding current is applied to supply the power necessary for welding.
3. A method according to claim 1 wherein said pulsed welding current is a one-half wave rectified alternating current.
4. A method according to claim 1 wherein the background direct and pulsed welding currents are applied in parallel to the work elements and the electrode.
5. A method according to claim 1 wherein the work piece elements are thin cupreous strips having zinc therein.
6. A method of arc welding thin strips with a non-consumable electrode in a gas shielded atmosphere which comprises applying to the strips and said electrode a background direct-current at a potential sufficient to maintain an arc, simultaneously applying a pulsed current having a frequency in the range between 15 and 240 pulses per second to the strips and said electrode in parallel relation to said background direct-current to supply power for welding, and moving said electrode with respect to said strips at a rate up to about 70 feet per minute thereby depositing on said strips a plurality of overlapping weld beads to form a series of uniform ripples along the weld on one surface of the work.
7. A method according to claim 6 wherein the background direct-current is equivalent to 15% to 85% of the total welding current.
8. A method according to claim 6 wherein said pulsed welding current is a one-half wave rectified alternating current.
9. A method for welding thin brass strips having a thickness below about 0.03 inch with a tungsten electrode in a gas shielded atmosphere which comprises applying background direct-current to said electrode and brass strips at a potential sufficient to maintain an arc therebetween, simultaneously applying a pulsed current having a frequency between 30 to 60 pulses per minute to said electrode and brass strips to supply power for welding, said background direct-current being equivalent to 15%–85% of the combined current of the direct and pulsed currents, and moving said electrode with respect to said strips at a rate between 7.5 to 70 feet per minute whereby a plurality of overlapping weld beads are produced to form a series of uniform ripples along the weld on said strip.
10. A method according to claim 9 wherein the gas shielding is argon, helium, or a mixture of these two gases, and the pulsed current is a one-half wave rectified alternating current.

References Cited

UNITED STATES PATENTS 3,339,107  8/1967  Aldenhoff _____ 219—131 X
3,390,250  6/1968  Apblett et al. _____ 219—196

JOSEPH V. TRUHE, Primary Examiner

J. G. SMITH, Assistant Examiner

U.S. Cl. X.R.

219—135

M1844
PO-1050
(5/69)

UNITED STATES PATENT OFFICE
CERTIFICATE OF CORRECTION

Patent No. 3,538,301          Dated November 3, 1970

Inventor(s) Robert A. Bray et al.

It is certified that error appears in the above-identified patent and that said Letters Patent are hereby corrected as shown below:

Column 1, line 22, "observe" should read --obverse--

Column 2, line 71, "curent" should read --current--

Column 3, lines 13 and 14, "---------" should read --full--

Column 3, line 57, "at rate" should read --a rate--

Column 4, line 59, "196" should read --1968--

SIGNED AND SEALED

FEB. 2, 1971

(SEAL)
Attest:

Edward M. Fletcher, Jr.
Attesting Officer

WILLIAM E. SCHUYLER
Commissioner of 1